(12) United States Patent
Kraft et al.

(10) Patent No.: US 10,759,559 B2
(45) Date of Patent: Sep. 1, 2020

(54) PLASTIC CONTAINER WITH THREADED NECK FINISH

(71) Applicant: Plastipak Packaging, Inc., Plymouth, MI (US)

(72) Inventors: Phil Kraft, Frankfort, IL (US); Matt Dauzvardis, Manhattan, IL (US)

(73) Assignee: Plastipak Packaging, Inc., Plymouth, MI (US)

( * ) Notice: Subject to any disclaimer, the term of this patent is extended or adjusted under 35 U.S.C. 154(b) by 229 days.

(21) Appl. No.: 14/751,463

(22) Filed: Jun. 26, 2015

(65) Prior Publication Data

US 2015/0375886 A1  Dec. 31, 2015

Related U.S. Application Data

(60) Provisional application No. 62/017,658, filed on Jun. 26, 2014.

(51) Int. Cl.
| | |
|---|---|
| *B65D 1/02* | (2006.01) |
| *B29C 49/42* | (2006.01) |
| *B65D 41/04* | (2006.01) |
| *B29K 23/00* | (2006.01) |
| *B29K 67/00* | (2006.01) |
| *B29L 31/00* | (2006.01) |

(52) U.S. Cl.
CPC ........ *B65D 1/0246* (2013.01); *B29C 49/4278* (2013.01); *B65D 41/0471* (2013.01); *B29K 2023/06* (2013.01); *B29K 2023/12* (2013.01); *B29K 2067/003* (2013.01); *B29L 2031/7158* (2013.01); *B65D 1/0261* (2013.01)

(58) Field of Classification Search
CPC .............. B65D 1/0246; B65D 41/0471; B65D 1/0261; B29C 49/4278; B29K 2023/12; B29K 2067/003; B29L 2031/7158
USPC ........................................................ 215/12.1
See application file for complete search history.

(56) References Cited

U.S. PATENT DOCUMENTS

| | | | | |
|---|---|---|---|---|
| 1,849,522 A | * | 3/1932 | Hammer ............ | B65D 41/0471 215/262 |
| 1,849,523 A | * | 3/1932 | Hammer ............ | B65D 41/0471 215/262 |
| 1,988,383 A | * | 1/1935 | Hermani ............ | B65D 41/0471 220/301 |
| 2,013,669 A | * | 9/1935 | Peters ................ | B65D 41/0471 220/296 |
| 3,774,795 A | | 11/1973 | Leenaards | |

(Continued)

FOREIGN PATENT DOCUMENTS

FR            2864519 B1      12/2006

OTHER PUBLICATIONS

ISA/USPTO; International Search Report and Written Opinion issued in corresponding international application No. PCT/US2015/037912; dated Sep. 24, 2015.

(Continued)

*Primary Examiner* — Ernesto A Grano
(74) *Attorney, Agent, or Firm* — Fishman Stewart PLLC

(57) ABSTRACT

A plastic container includes a neck portion, a sidewall portion, and a base portion. The neck portion includes a plurality of threads, which may be configured to retain and/or secure a cap or lid. In embodiments, the threads may be blown and/or the neck portion may include a neck rib provided vertically above the threads.

33 Claims, 10 Drawing Sheets

(56) References Cited

U.S. PATENT DOCUMENTS

| | | | |
|---|---|---|---|
| 4,006,837 A * | 2/1977 | Gates | B65D 41/0471 215/333 |
| 4,662,530 A * | 5/1987 | Goncalves | B65D 41/04 215/330 |
| 5,678,711 A | 10/1997 | Tobias | |
| 5,944,207 A * | 8/1999 | Reidenbach | B65D 41/0471 215/237 |
| 5,967,352 A | 10/1999 | Repp et al. | |
| 6,062,408 A | 5/2000 | Beck et al. | |
| D428,815 S * | 8/2000 | Mooney | D9/520 |
| 6,124,008 A | 9/2000 | Barre | |
| D442,866 S * | 5/2001 | Mooney | D9/520 |
| 6,227,391 B1 | 5/2001 | King | |
| 6,228,317 B1 | 5/2001 | Smith et al. | |
| 6,495,226 B1 | 12/2002 | Slat | |
| 6,568,156 B2 * | 5/2003 | Silvers | B65B 3/022 53/140 |
| 6,648,157 B2 | 11/2003 | Shai et al. | |
| 6,740,284 B2 | 5/2004 | Darr et al. | |
| 6,763,968 B1 | 7/2004 | Boyd et al. | |
| 6,857,531 B2 | 2/2005 | Slat et al. | |
| 6,933,055 B2 * | 8/2005 | Share | B29C 49/0005 215/12.2 |
| 6,997,336 B2 | 2/2006 | Yourist et al. | |
| 7,083,059 B1 | 8/2006 | Le Guen | |
| 7,182,213 B2 | 2/2007 | King | |
| 7,207,451 B2 | 4/2007 | Taylor et al. | |
| 7,691,290 B2 | 4/2010 | Deshpande et al. | |
| 7,732,035 B2 | 6/2010 | Pedmo et al. | |
| 7,861,874 B2 | 1/2011 | Cook et al. | |
| 7,866,496 B2 | 1/2011 | Kraft | |
| 8,292,102 B2 | 10/2012 | Penny et al. | |
| 8,596,029 B2 | 12/2013 | Pedmo et al. | |
| 8,672,159 B2 * | 3/2014 | Moreira | B65D 1/0246 215/262 |
| 8,870,006 B2 * | 10/2014 | Kamineni | B65D 1/0223 215/381 |
| 9,150,320 B2 * | 10/2015 | Wurster | B65D 1/0276 |
| 9,205,958 B2 * | 12/2015 | Cook | B65D 1/165 |
| 2004/0000127 A1 * | 1/2004 | Joshi | B65D 23/102 53/431 |
| 2004/0173565 A1 * | 9/2004 | Semersky | B65D 1/0223 215/382 |
| 2005/0163882 A1 | 7/2005 | Dunlap et al. | |
| 2006/0011633 A1 * | 1/2006 | Cook | B65D 41/0471 220/298 |
| 2007/0012650 A1 * | 1/2007 | Eble | B65D 1/0223 215/382 |
| 2007/0045216 A1 | 3/2007 | Gami et al. | |
| 2008/0314856 A1 | 12/2008 | Penny et al. | |
| 2009/0008360 A1 | 1/2009 | Piccioli et al. | |
| 2011/0024382 A1 | 2/2011 | Moreira | |
| 2011/0100988 A1 | 5/2011 | Fraser et al. | |
| 2011/0171405 A1 | 7/2011 | Deshpande | |
| 2011/0172335 A1 | 7/2011 | Deshpande | |
| 2011/0220668 A1 | 9/2011 | Steih et al. | |
| 2012/0000879 A1 | 1/2012 | McFarlane et al. | |
| 2012/0061410 A1 | 3/2012 | Kamineni et al. | |
| 2012/0255927 A1 | 10/2012 | Cook | |
| 2013/0206718 A1 | 8/2013 | Toribio et al. | |
| 2015/0274378 A1 * | 10/2015 | Galownia | B65D 41/0414 215/337 |

OTHER PUBLICATIONS

English Summary of first Chinese Office Action, 201580043810.8, dated Nov. 29, 2017.
European Office Action, 15 812 411.5-1017, dated May 31, 2019.

* cited by examiner

PLASTIC CONTAINER WITH THREADED NECK FINISH

CROSS-REFERENCE TO RELATED APPLICATION

This application claims the benefit of U.S. Provisional Application Ser. No. 62/017,658, filed Jun. 26, 2014, which application is fully incorporated herein by reference.

TECHNICAL FIELD

The present invention relates to plastic containers, including plastic containers having a threaded neck finish.

BACKGROUND

Plastic containers with threaded neck finishes are known in the art. The technology has advanced to where a neck finish may include threading that is injection molded or blow molded. Moreover, plastic neck finishes may be used for various container applications, including "wide-mouth" and/or hot-fill container applications, as well as those that require the neck finish to hold its shape over an extended period of time and to maintain structural and seal integrity with respect to a closure.

Among other things, it can be desirable to provide a plastic container with a threaded neck finish that can replace glass jars, including "wide-mouth" round jars; accommodate reclosable caps or lids, including metal caps or lids commonly used with glass jars; and/or run on equipment commonly used in connection with glass jar production and handling.

SUMMARY

A plastic container includes a neck portion, a sidewall portion, and a base portion. The neck portion includes a plurality of threads, which may be configured to retain and/or secure a cap or lid. In embodiments, the threads may be blown and/or the neck portion may include a neck rib provided vertically above the threads. Methods for forming a container are also disclosed.

BRIEF DESCRIPTION OF THE DRAWINGS

Embodiments of the disclosure will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined herein and by appended claims.

Figure 1:
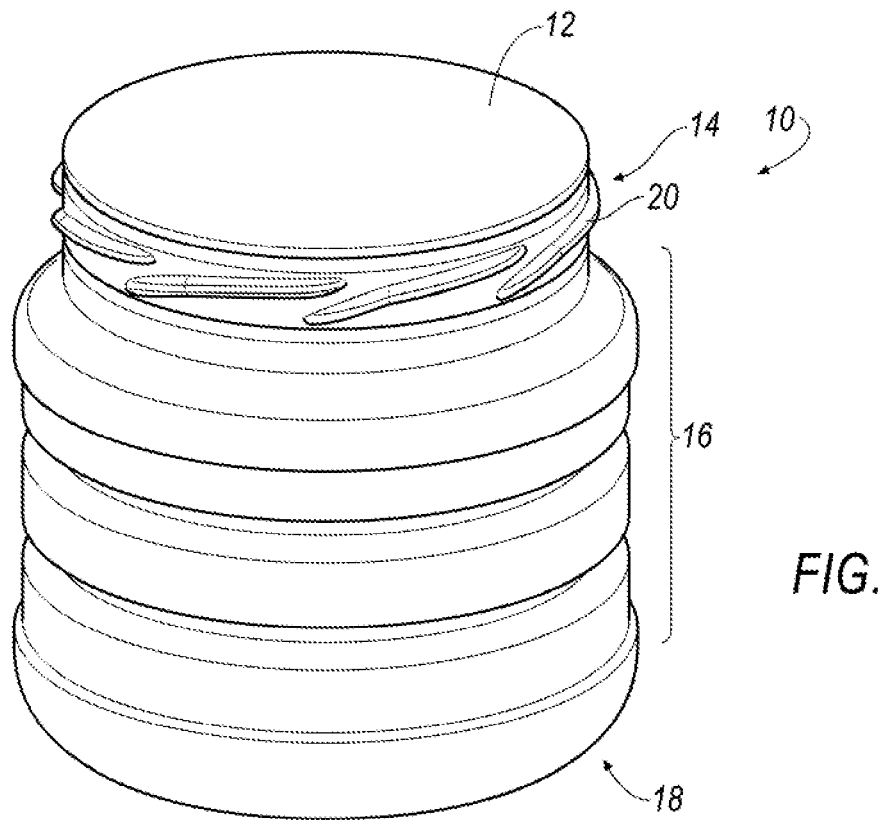
FIG. 1 is a perspective view of a three-dimensional model of an embodiment of a container that incorporates features of the present teachings.

With reference to FIG. 1, a three-dimensional model of an embodiment of a container 10 is generally illustrated. The container 10 includes an opening 12, which if desired can be further covered with an optional seal. The opening 12 can serve to fill and/or dispense container contents. The container 10 includes a neck portion 14, a sidewall portion 16, and a base portion 18.

Embodiments of a container may be formed from various polymers known in the field of container manufacture including, for example and without limitation, polyethylene terephthalate (PET), polyethylene (PE), polypropylene (PP), and combinations and blends of two or more polymers. For embodiments, the container may, for example and without limitation, be produced by an injection stretch blow molding (ISBM) blow-trim process. In an embodiment, an injection molded preform may be stretch blow molded into an intermediate article that includes the general form/configuration of a container with blown threads, such as disclosed herein. An example of such an intermediate article and related process may be generally found in U.S. Patent Publication No. 2005/0163882 and U.S. Pat. No. 6,740,284, which are each incorporated herein by reference in their entirety. Thereafter, a portion of the intermediate article provided above the neck portion (including the blown threads), e.g., a moil or a dome, may be trimmed off or otherwise separated to leave a container as shown and described in this disclosure. The container may, if desired, be heat-treated using various processes, including those that can improve the ability of a container to be hot-filled.

Figure 2:
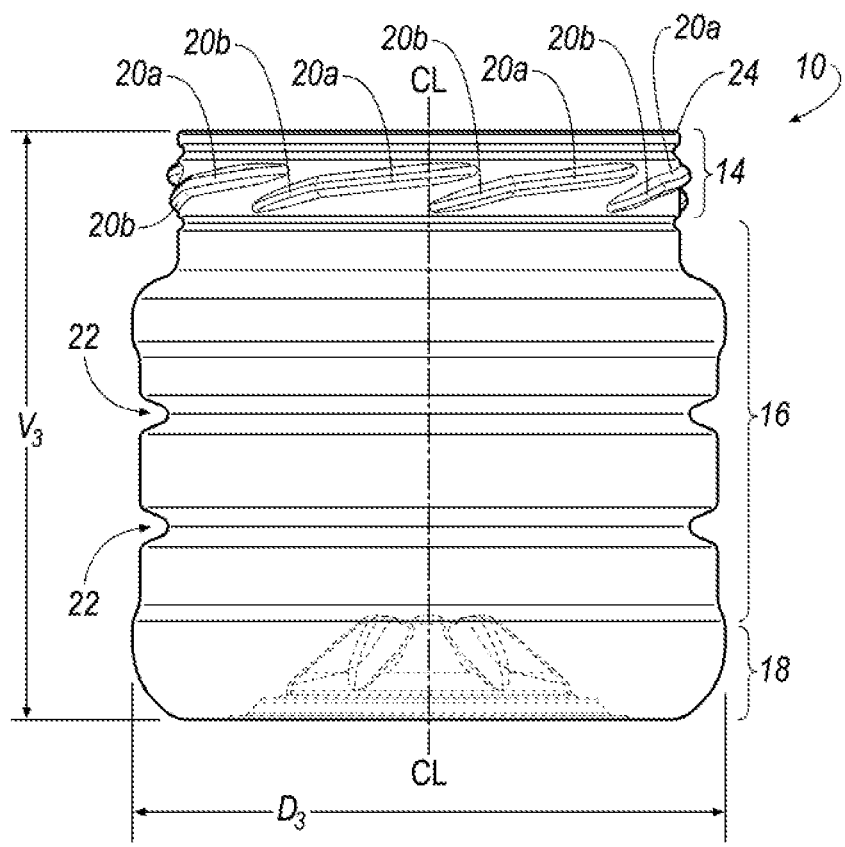
FIG. 2 is a side elevational view of an embodiment of a container incorporating features of the present teachings.

FIG. 2 generally illustrates a side elevational view of a container 10 embodying teachings of the present disclosure. The neck portion 14 is shown including a plurality of threads 20, which may also be referred to as "threading formations"

or "lugs." In embodiments, the neck portion, and the threads, may be injection molded or, alternatively, may be blown or blow molded.

As generally illustrated, threads 20 may be provided around, and extend radially outwardly from, an outer surface of the neck portion 14. The illustrated container 10 includes eight threads 20. However, embodiments of the container may include more or less than eight threads. Moreover, successive threads 20—following around the circumference of the neck portion 14—may have portions that vertically overlap, but are vertically spaced, from each other. Each thread 20 may be generally provided at a single angle relative to a vertical centerline CL or, as shown in the illustrated embodiment, may include more than one portion—such as first portion 20a and a second portion 20b.

Embodiments having a neck portion 14 such as generally illustrated and described herein may, for example, be used in connection with various wide-mouth plastic containers, including those replacing glass jars and related applications. Such wide-mouth plastic containers may have openings that range, for example and without limitation, from 63 mm to 82 mm, and for some applications could be 83 mm or more.

Figure 3:
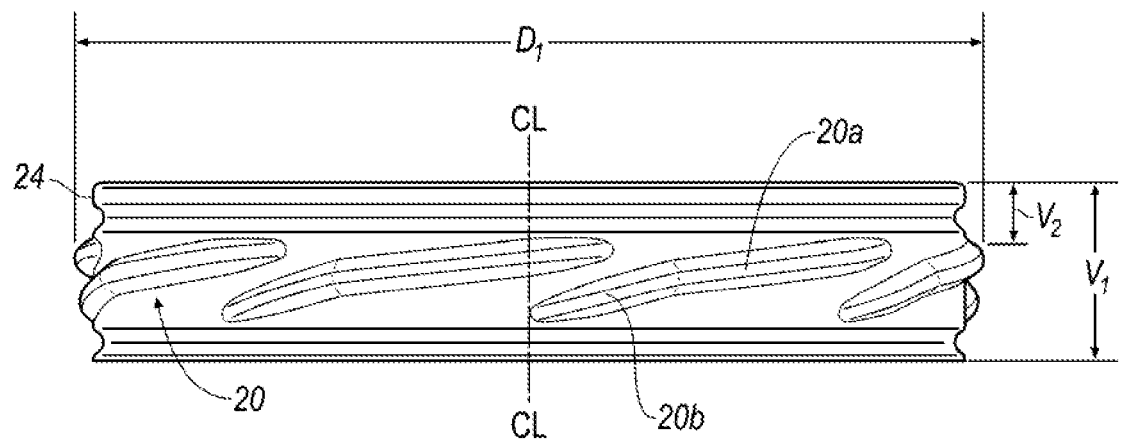
FIG. 3 is a partial side view of a neck finish portion of an embodiment of a container incorporating features of the present teachings.

With reference to FIG. 3, the neck portion 14 may include a neck rib 24 provided above the threads 20. The inclusion of one or more neck ribs 24 provided above the threads 20 can, among other things, help maintain container hoop strength and/or prevent or reduce ovality associated with the neck portion 14. A neck rib 24 can be helpful for running plastic containers on lines, such as existing glass jar lines, including those that employ a belt system for in-line capping. For some systems, one device (e.g., set of belts) can be configured to turn the jar or container in a first direction, while another device may turn a cap in an opposite rotational direction to engage and seal a container.

The neck portion 14 may further include a first portion 20a and a second portion 20b of a thread 20 may be generally provided at different angles relative to the center line CL of the container 10. As generally illustrated, the angle (relative to the center line CL) of the first portion 20a may be greater (and even visually perceptibly greater) than the angle of the second portion 20b. That is, and with respect to a different perspective, if a plane of a support surface upon which the container may rest is viewed as being flat at 0 degrees, the angle associated with the first portion 20a (relative to the support surface) may be lesser/less steep (and even visually/perceptively less step) than the angle associated with the second portion 20b. Additionally, for embodiments, a portion of the second portion 20b may extend in a vertical direction (and at a continued angle) below a secured cap or lid, and such portion may be at least partially visible when the cap or lid is secured to the container.

With embodiments, the vertical distance V1 of the neck portion 14 may be significantly less than the outer diameter D1 of the neck portion 14. In an embodiment of the container, the neck finish of the container may comprise, for example, an 82 mm or an 83 mm blown finish. For example, and without limitation, with embodiments the diameter D1 of the neck portion 14 may be about five times (or even more for some embodiments) greater than the vertical distance V1 of the neck portion 14. Additionally, the uppermost portion of the threads 20 may be offset from the top or uppermost portion of the container 10 by a vertical distance V2. For some embodiments, the offset distance, illustrated in the embodiment as vertical distance V2, may be about one-third of vertical distance V1. For example, and without limitation, V2 for an 82 mm or 83 mm blown finish container may be about 0.206 in. (5.24 mm), while V1 may be about 0.630 in. (16.002 mm).

Further, for some embodiments, the total height, or vertical distance V3 of the container 10, may be substantially the same as the greatest diameter D3 of the container 10. For other embodiments, the difference between vertical distance V3 and the greatest diameter D3 may be within about one percent (1%) of each other. For other embodiments, the difference between vertical distance V3 and the greatest diameter D3 may be within about five percent (5%) of each other.

As generally illustrated in FIG. 2, embodiments of the sidewall portion 16 of a container 10 may include one or more horizontal straps 22, grooves, and/or other formations. Such straps 22, grooves, or other formations may provide additional structure and/or support to the sidewall portion 16. With embodiments, the sidewall portion 16 may be configured to help maintain hoop strength. For example, and without limitation, some embodiments, such as those disclosed in U.S. Pat. No. 6,857,531 and U.S. Patent Application Publication 2012/0061410, which are incorporated herein in their entirety by reference, may include various ribs or formations. The sidewall portion is generally illustrated as being circular in nature; although, other shapes and/or formations may be associated with or included in the sidewall portion 14.

For some embodiments, the container may include one or more barrier materials. For example, an oxygen scavenging barrier material (such as commercially available under the trade name DiamondClear) may be employed. Such materials can, among other things, help to keep oxygen away from container contents. Some examples of such materials are, without limitation, generally disclosed in U.S. Pat. No. 7,691,290; U.S. Patent Application Publication 2011/0172335; U.S. Patent Application 2011/0171405, which are each incorporated herein in their entirety by reference.

Figure 4:
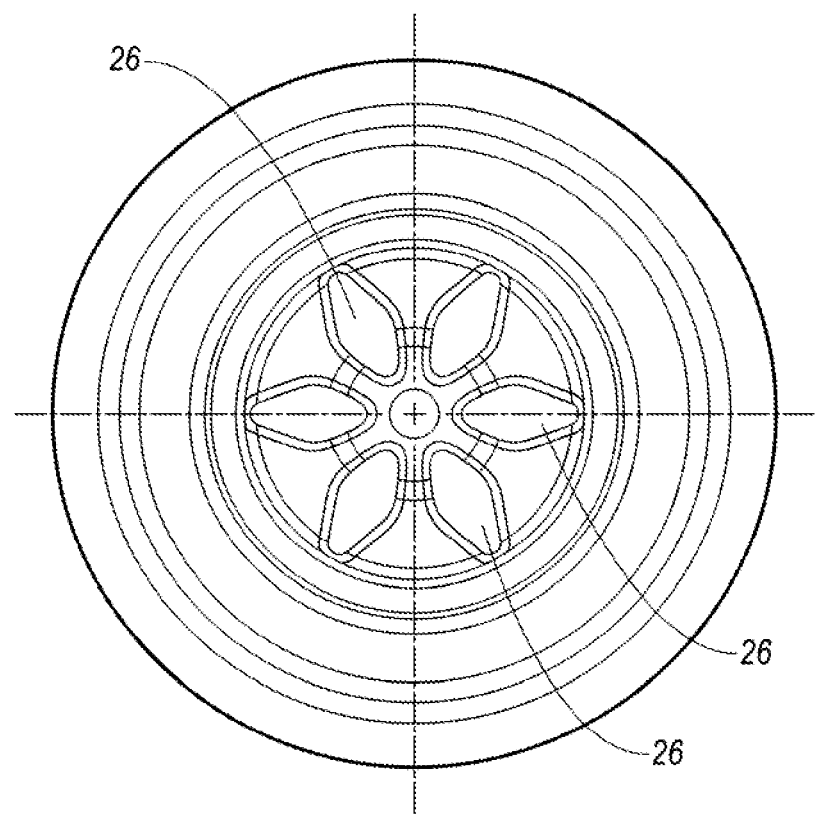
FIG. 4 is a bottom plan view of an embodiment of container incorporating features of the present teachings.

With reference to FIG. 4, the base portion 18 may include formations, such as a plurality of ribs 26 arranged radially about the center line CL of the container. The formations can strengthen/reinforce the base portion 18 so that the container can handle pressures and/or temperatures for given applications, such as hot-fill applications, without retort or unacceptable ovalization. Without limitation, an example of a base portion that includes structural formations to increase the rigidity of a base portion is disclosed in U.S. Pat. No. 7,732,035, which is incorporated in its entirety herein by reference.

Figure 5:
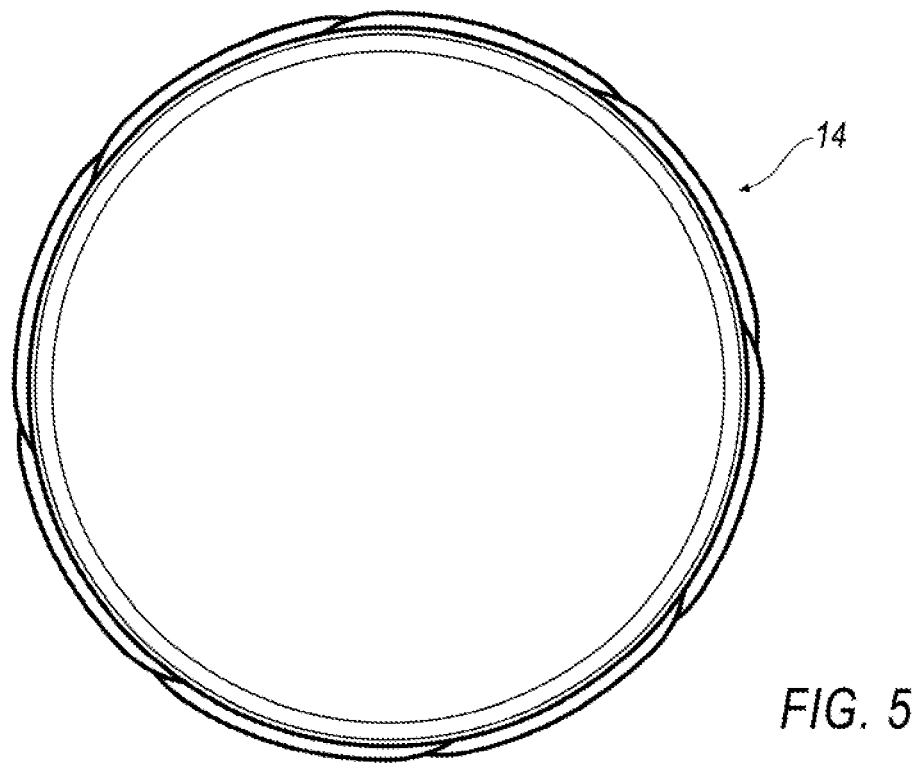
FIG. 5 is a top plan view of a neck portion of an embodiment of a container incorporating features of the present teachings.
Figure 6A:
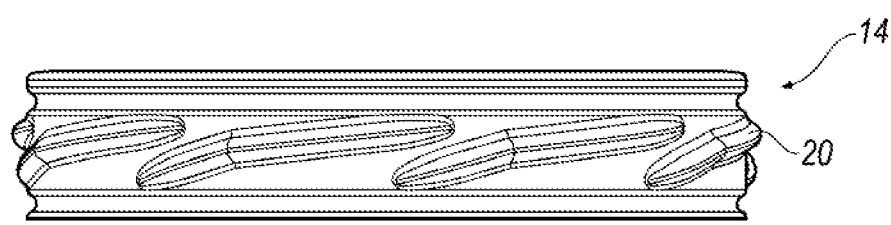
FIGS. 6A and 6B are front and right side views, respectively, of the neck portion shown in FIG. 5.
Figure 6B:
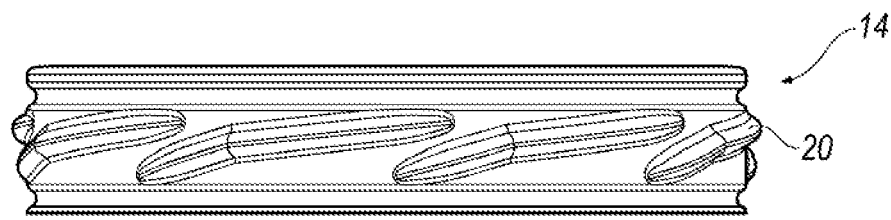

FIG. 5 illustrates a top view of an embodiment of a neck portion 14 embodying features of the present teaching. FIGS. 6A and 6B generally depict an embodiment of a neck portion with a plurality of threads 20 shown from a front and right side, respectively.

Figure 7:
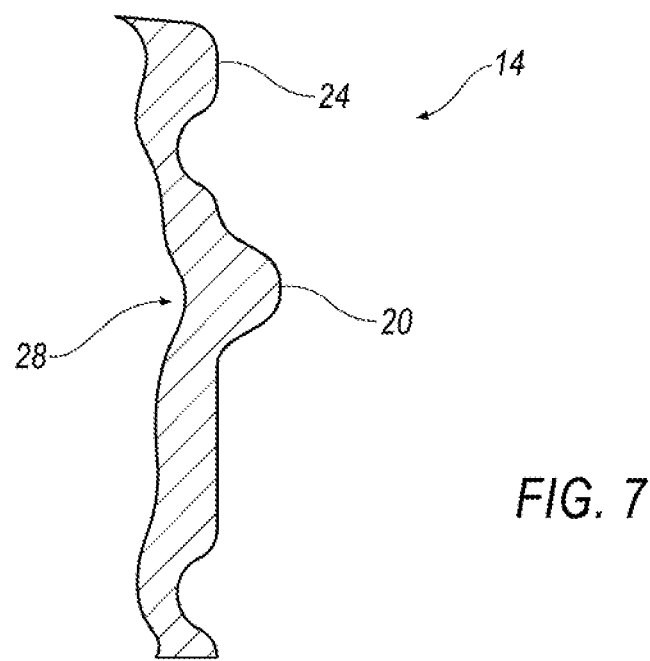
FIG. 7 is a side cross-sectional view of a neck portion such as generally shown in FIG. 5.
Figure 8:
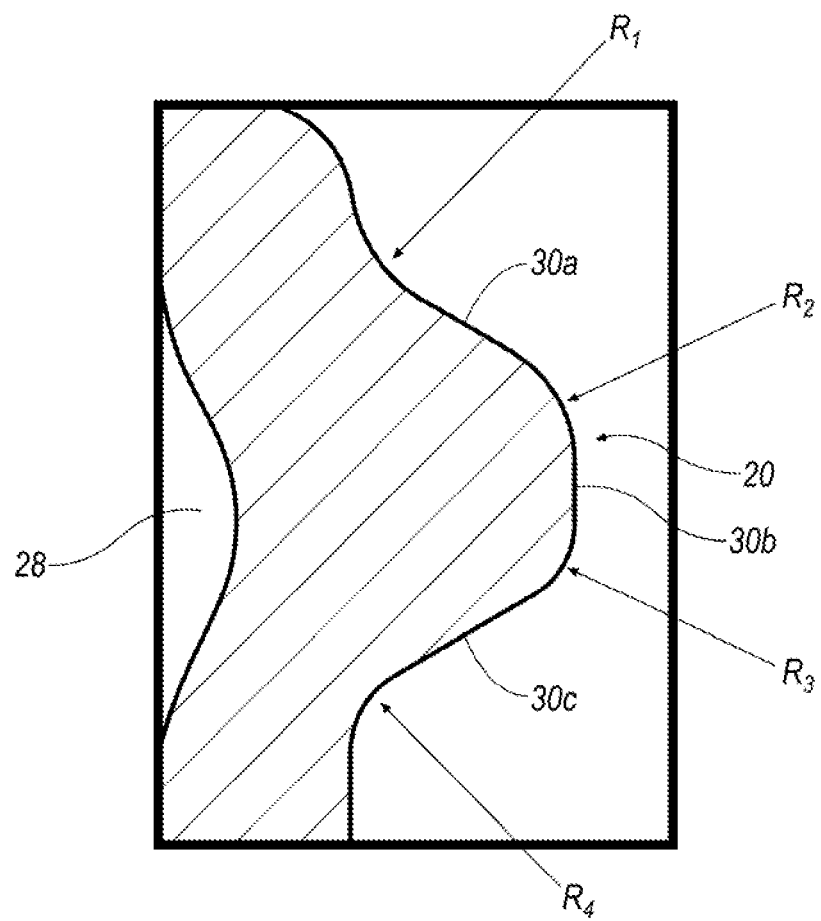
FIG. 8 is an enlarged cross-section view of the a portion of the neck portion generally illustrated in FIG. 7.
Figure 9:
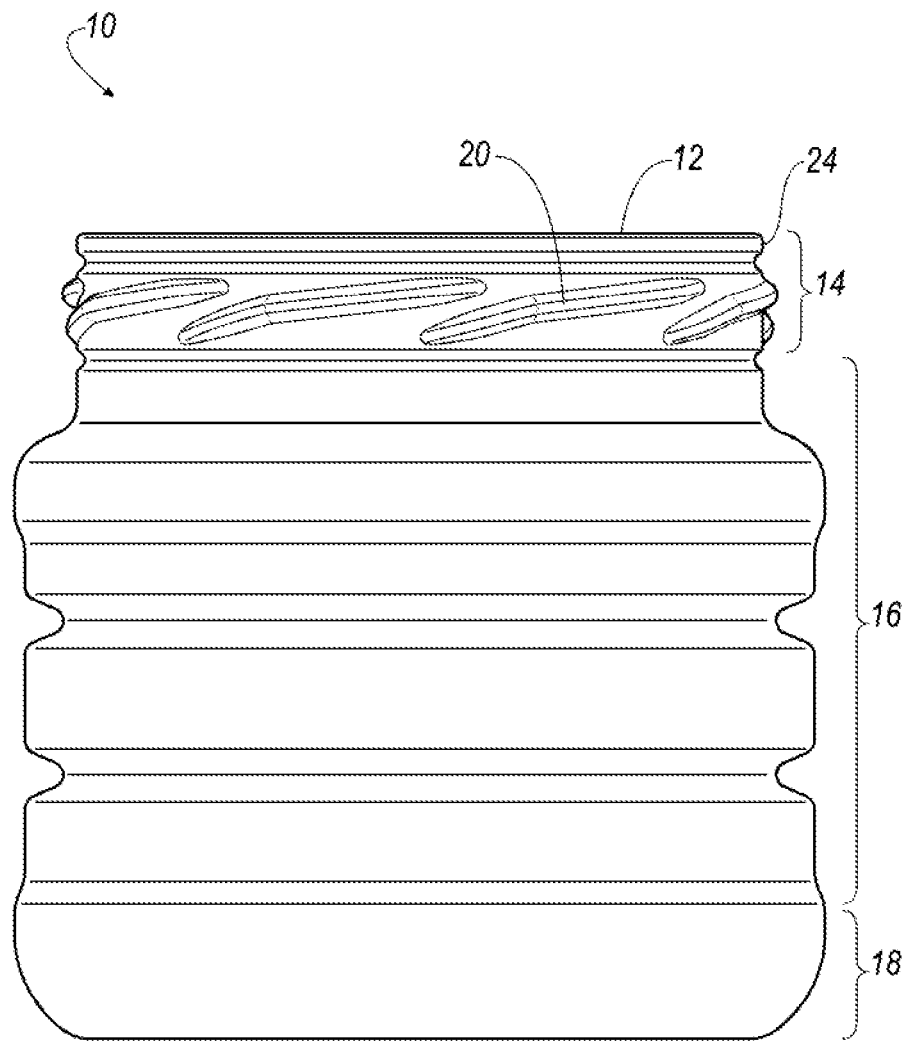
FIG. 9 is a front elevational view of a an embodiment of a container incorporating features of the present teachings; the left, right, and back view being substantially similar in the instant embodiment.
Figure 10:
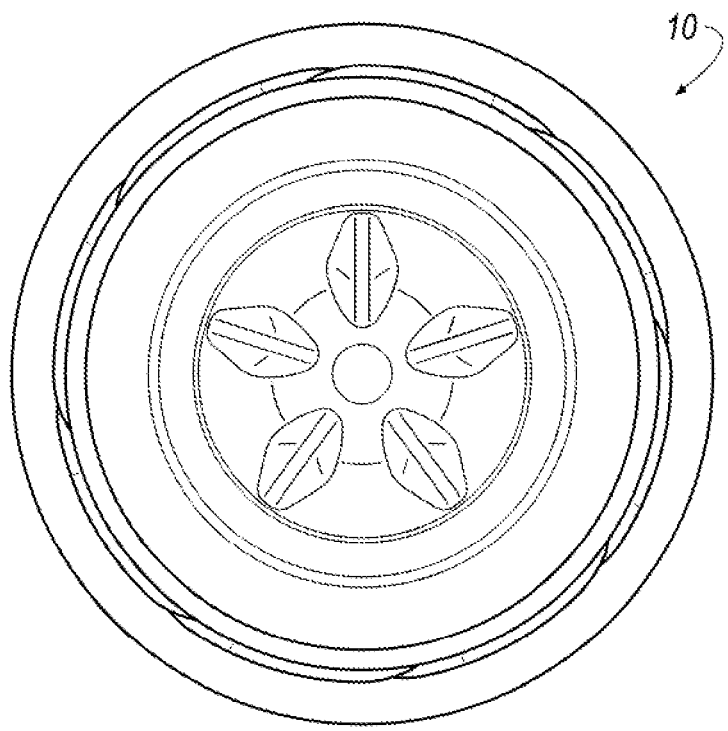
FIG. 10 is a top plan view of the embodiment of a container shown in FIG. 9, including portions of the base visible through the container opening.
Figure 11:
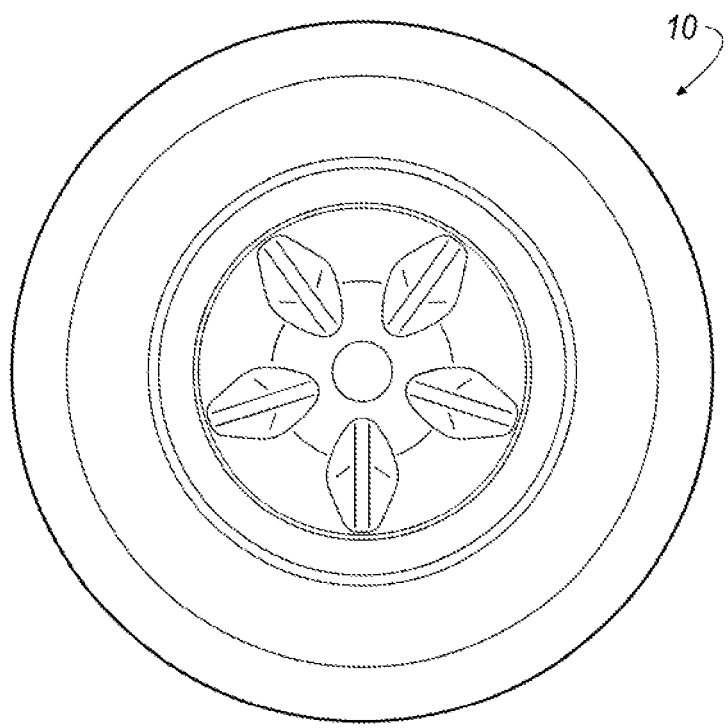
FIG. 11 is a bottom plan view of the embodiment of a container shown in FIG. 9.
Figure 12:
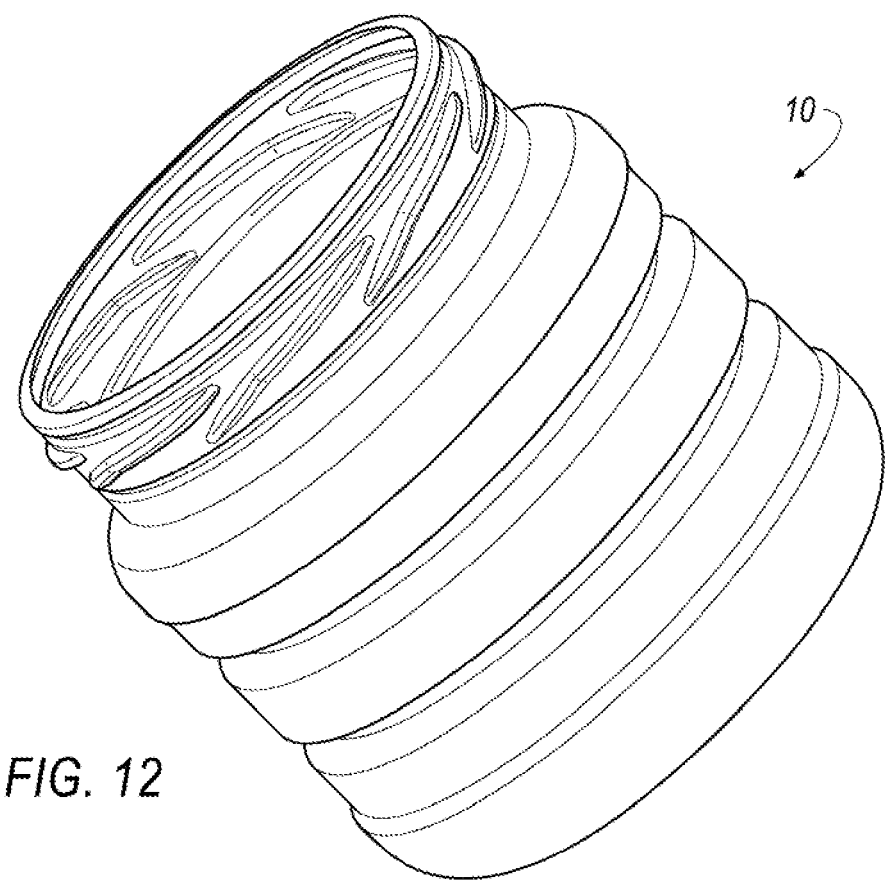
FIGS. 12, 13, and 14 are various different perspective views of the embodiment of a container shown in FIG. 9.
Figure 13:
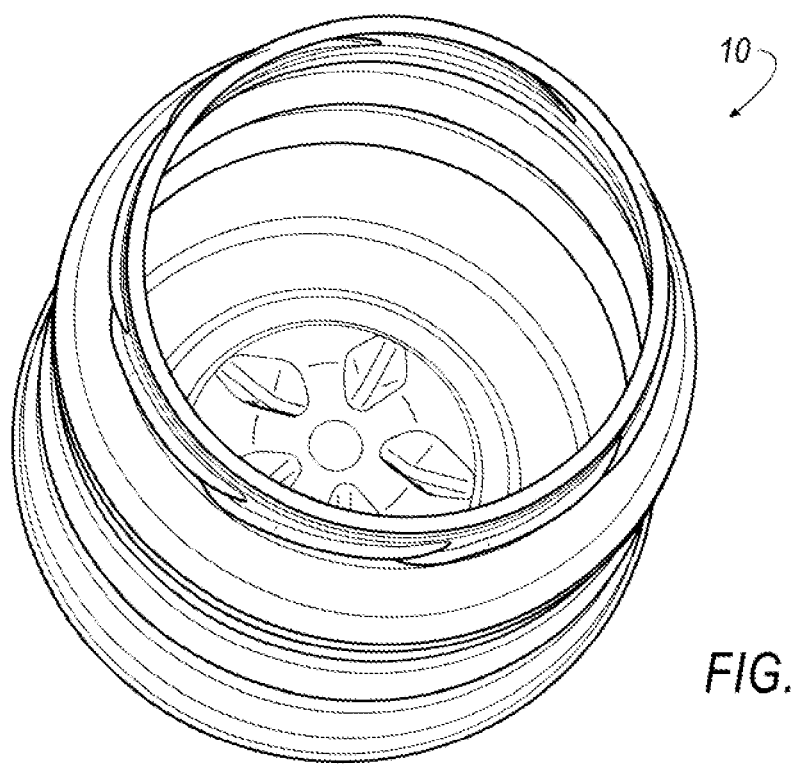
Figure 14:
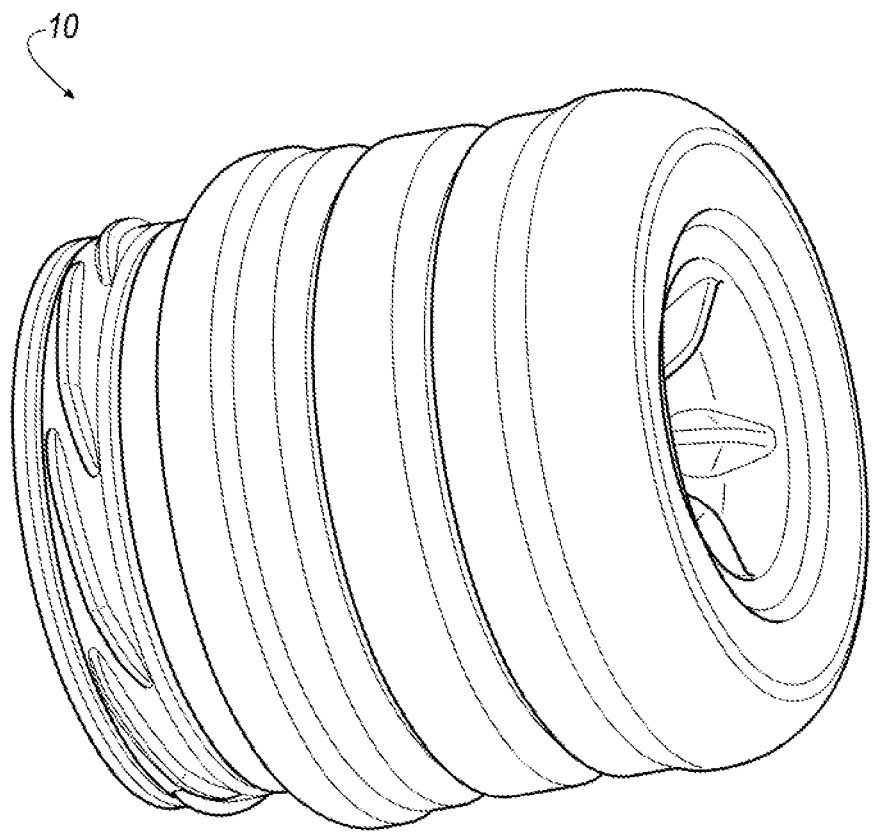

FIG. 7 illustrates a partial cross-sectional view of a neck portion embodying features of the present teachings. FIG. 8 illustrates an enlarged cross-section view of a portion of the neck portion generally depicted in FIG. 7. In the illustrated embodiment, the thread 20 is shown extending (radially) outwardly relative to other portions/segments of the neck portion, and a recess 28 is shown included on the inside (inner radial) wall of the thread. With embodiments, the recess 28 may be generally in the form of a symmetrical curve. As generally illustrated the thread 20, when viewed in cross-section as shown, may include at least three segments—i.e., 30a, 30b, and 30c. Segments 30a and 30c may be generally provided at an angle (viewed in cross section) from the horizontal. In the illustrated embodiment the angle for the segments is about 30 degrees (relative to a base/horizontal plane; i.e., 60 degrees relative to the center line CL of the container). For other embodiments, the angle may be about 30±15 degrees. Segment 30b may include a portion that is substantially closer to a vertical line (e.g., parallel to a center line CL of the container).

Further, the shape of the threads may not necessarily be "symmetrical" (viewed in cross section) for some embodiments. In embodiments, several segments of the thread 20 may include different radiuses associated with curvature. The embodiment of a thread 20 illustrated in FIG. 8 includes and identifies several specific radii—i.e. R1, R2, R3, and R4. For example and without limitation, R1 may be 0.040 in. (1.02 mm), R2 may be 0.035 in (0.90 mm), R3 may be 0.023 in. (0.59 mm), and R4 may be 0.025 in. (0.64 mm). In this embodiment, the relative measurements of R1 and R2 are larger (compared to R3 and R4) and are fairly close to one another (i.e., within 0.005 in.). At the same time, R3 and R4 are comparatively smaller relative measurements (relative to R1 and R2), and are fairly close to each other (i.e., within 0.002 in.). Such radii can provide a thread shape that is desirable for a cap or lid closure application.

FIGS. 9-14 generally illustrate embodiments of a container 10 embodying features of the present teachings, with the container shown from different standard and perspective views.

Figure 15:
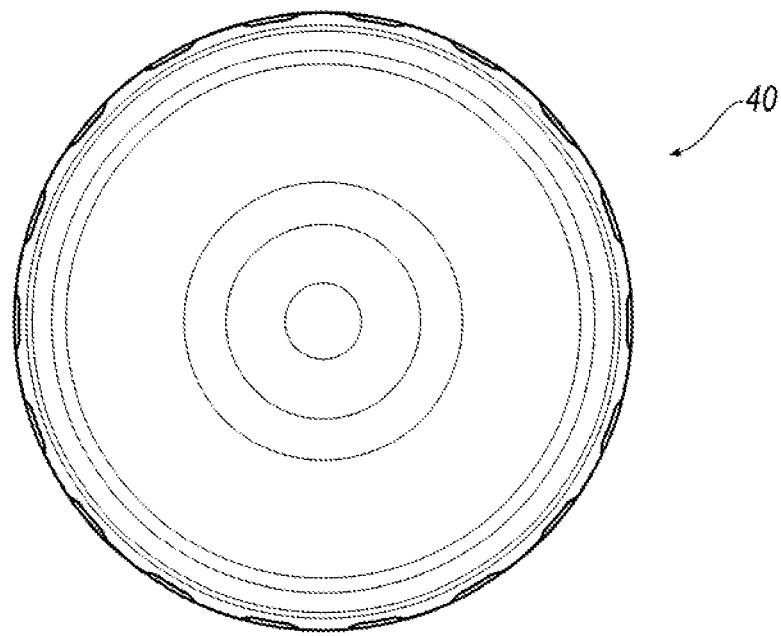
FIGS. 15, 16, and 17 are top plan, bottom plan, and side views of an embodiment of a closure that may be used to engage a neck portion of a container.
Figure 16:
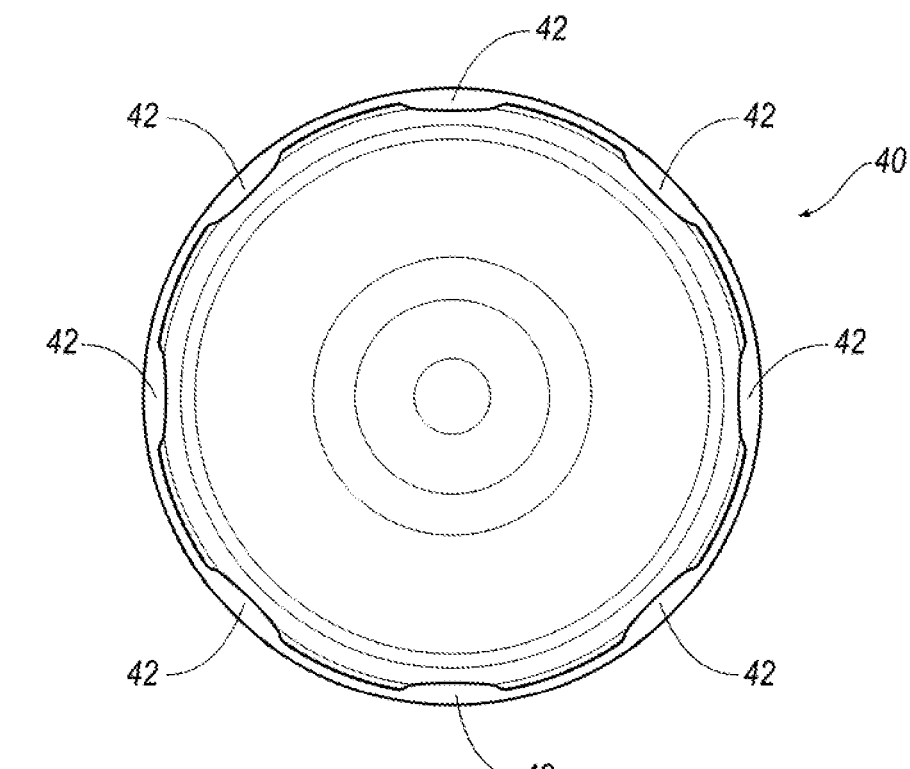
Figure 17:
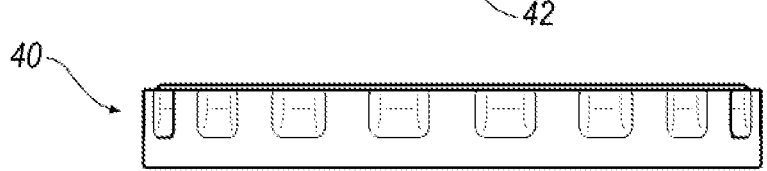
Figure 18:
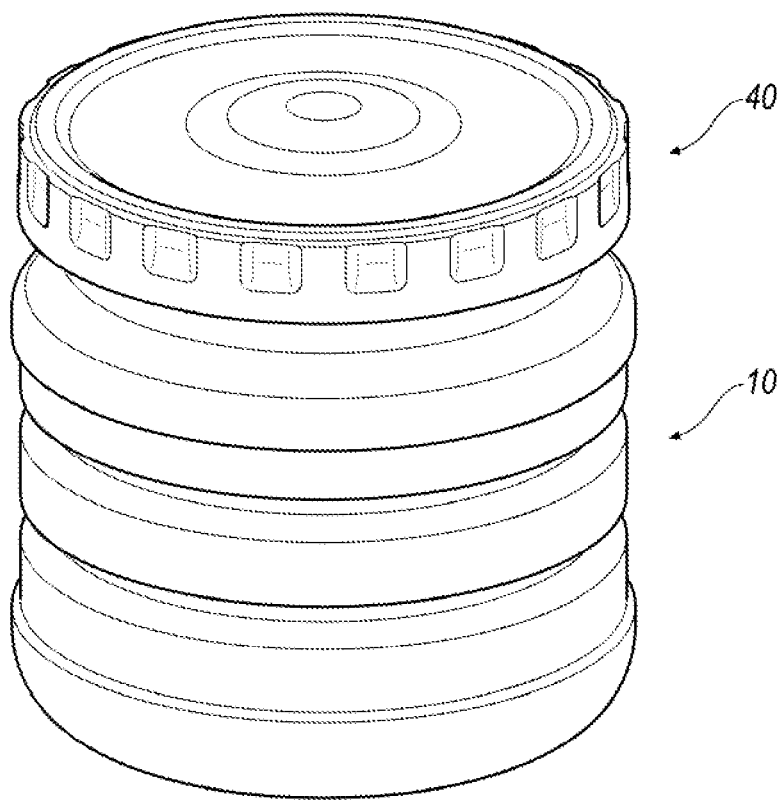
FIG. 18 generally illustrates an embodiment of a closure engaged to a container in accordance with teachings of the present disclosure.

FIGS. 15-17 generally illustrate top plan, bottom plan, and side views of an embodiment of a closure 40 that may be used to engage a neck portion of a container. As generally illustrated in FIG. 16, the closure 40 may include a plurality of bent or radially inwardly extending portions 42 that can be configured to engage threads 20—such as when a closure is screwed (e.g., clockwise) onto the neck portion of a container. While eight bent or radially inwardly extending portions are generally illustrated in FIG. 16, the present disclosure is not limited to that number, and embodiments of closures may have different sizing and/or shapes, and may include more or less such features. FIG. 18 generally illustrates an embodiment of a closure 40 engaged to a container 10 in accordance with teachings of the present disclosure.

While not necessarily desirable for all applications, such as where relatively higher heats are associated with contents (e.g., some food contents), some embodiments may employ a base portion that provides a degree of intended flexibility. An example of a base structure with a measure of flexibility that may be employed for some applications is disclosed in U.S. Pat. No. 8,596,029, which is incorporated herein by reference.

A potential benefit of providing containers with neck portions as taught and described in the instant disclosure is that such containers may be able to be run on existing glass container lines, as well as potentially utilizing lids commonly employed with glass containers. Moreover, containers embodying features of the present teachings have been sufficiently strong to maintain vacuum and provide full functionality in connection with tamper-evident metal closures (such as those in which one can listen for a "pop" of "click") to help ensure product safety.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A plastic container comprising:
   a neck portion, the neck portion including an opening and a plurality of threads disposed vertically below the opening;
   a sidewall portion extending below the neck portion; and
   a base portion extending below the sidewall portion;
   wherein each of the plurality of threads include a first portion and a second portion, the first portion is provided at a first angle relative to a centerline of the plastic container, the second portion is provided at a second angle relative to the centerline of the container, the first angle and second angle are different, first portions of each of the plurality of threads vertically overlap and are vertically spaced above a second portion of a successive thread, the plurality of threads extend in succession around the entire circumference of the neck portion, and each thread extends around less than one-quarter of the entire circumference of the neck portion, and the spacing of portions of successive threads of the neck portion is configured to receive more than four bent or radially extending portions of a screw-on closure.

2. The plastic container of claim 1, wherein the plurality of threads are blow molded.

3. The plastic container of claim 1, wherein the plurality of threads are injection molded.

4. The plastic container of claim 1, wherein the plastic container is comprised of polyethylene terephthalate (PET), polyethylene (PE), or polypropylene (PP).

5. The plastic container of claim 1, wherein the plastic container is comprised of a blend of two or more polymers.

6. The plastic container of claim 1, wherein the first angle is greater than the second angle.

7. The plastic container of claim 1, wherein the second portion extends vertically downward to an extent that a portion of the second portion is visible when a cap or lid is secured to the container by the plurality of threads.

8. The plastic container of claim 1, wherein an outer diameter of the neck portion is at least about five times greater than a distance of the neck portion.

9. The plastic container of claim 1, wherein an uppermost portion of the first portion of the threads is offset from an uppermost portion of the container by a vertical distance that is about one-third of a total vertical distance of the neck portion.

10. The plastic container of claim 1, wherein an uppermost portion of the first portion of the threads is offset from an uppermost portion of the container by a vertical distance of about 5.24 mm.

11. The plastic container of claim 1, wherein a total height of the container is the same or within one percent of a greatest diameter of the container.

12. The plastic container of claim 1, wherein the total height of the container is within three percent of the greatest diameter of the container.

13. The plastic container of claim 1, wherein the total height of the container is within five percent of the greatest diameter of the container.

14. The plastic container of claim 1, including one or more horizontally-extending straps or grooves.

15. The plastic container of claim 1, wherein the container is heat treated or heat set.

16. The plastic container of claim 1, wherein the container includes one or more barrier materials.

17. The plastic container of claim 16, wherein the one or more barrier materials comprises an oxygen scavenging material.

18. The plastic container of claim 1, wherein the base portion includes a plurality of radially extending ribs.

19. The plastic container of claim 1, wherein the neck portion includes a recess provided with respect to an inside wall of at least one of the plurality of threads.

20. The plastic container of claim 19, wherein, viewed in cross-section, the recess is generally a symmetrical curve.

21. The plastic container of claim 1, wherein, when viewed in cross-section, each of the plurality of threads comprises a first segment, a second segment, and a third segment, with each segment having a different curvature.

22. The plastic container of claim 21, wherein the first segment and third segment are generally provided at an angle of about 60 degrees relative to a center line of the container.

23. The plastic container of claim 21, wherein the first segment and third segment are generally provided at an angle of about 30±15 degrees relative to a center line of the container.

24. The plastic container of claim 21, wherein the second segment includes a portion that is substantially parallel to the center line of the container.

25. The plastic container of claim 1, wherein a cross-sectional shape of each of the plurality of threads is not symmetrical.

26. The plastic container of claim 1, wherein several segments of each of the plurality of threads includes different radii of curvature.

27. The plastic container of claim 1, wherein the plurality of threads comprise eight threads, and the spacing of portions of successive threads of the neck portion is configured to receive eight bent or radially extending portions of said screw-on closure.

28. The plastic container of claim 1, wherein the plurality of threads comprise more than eight threads.

29. The plastic container of claim 1, wherein the neck portion includes a neck rib provided above the plurality of threads.

30. The plastic container of claim 1, wherein the opening has a diameter between about 63 mm to about 82 mm.

31. The plastic container of claim 1, wherein the opening has a diameter greater than 82 mm.

32. A method for making a plastic container, comprising:
providing a plastic preform;
blow molding the preform into an intermediate article that includes a neck portion with a plurality of blown threads, wherein each of the plurality of blown threads include a first portion and a second portion, the first portion is provided at a first angle relative to a centerline of the intermediate article, the second portion is provided at a second angle relative to the centerline of the intermediate article, the first angle and second angle are different, first portions of each of the plurality of blown threads vertically overlap and are vertically spaced above a second portion of a successive thread, the plurality of blown threads extend in succession around the entire circumference of the neck portion, and each thread extends around less than one-quarter of the entire circumference of the neck portion; and
removing an upper portion of the intermediate article.

33. The method of claim 32, including heat treating the plastic container.

* * * * *